US010968328B2

(12) United States Patent
Ohya et al.

(10) Patent No.: US 10,968,328 B2
(45) Date of Patent: Apr. 6, 2021

(54) POROUS POLYIMIDE FILM PRODUCTION METHOD AND POROUS POLYIMIDE FILM PRODUCED USING SAID METHOD

(71) Applicant: UBE INDUSTRIES, LTD., Yamaguchi (JP)

(72) Inventors: Shusei Ohya, Yamaguchi (JP); Makoto Matsuo, Yamaguchi (JP); Yuuichi Fujii, Yamaguchi (JP); Keita Bamba, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 211 days.

(21) Appl. No.: 16/320,415

(22) PCT Filed: Jul. 25, 2017

(86) PCT No.: PCT/JP2017/026935
§ 371 (c)(1),
(2) Date: Jan. 24, 2019

(87) PCT Pub. No.: WO2018/021356
PCT Pub. Date: Feb. 1, 2018

(65) Prior Publication Data
US 2019/0263997 A1   Aug. 29, 2019

(30) Foreign Application Priority Data
Jul. 25, 2016   (JP) .............................. JP2016-145811

(51) Int. Cl.
*C08J 9/28* (2006.01)
*C08J 5/18* (2006.01)
*C08G 73/10* (2006.01)

(52) U.S. Cl.
CPC ................ *C08J 9/28* (2013.01); *C08G 73/10* (2013.01); *C08G 73/1085* (2013.01); *C08J 5/18* (2013.01);
(Continued)

(58) Field of Classification Search
CPC ... C08J 9/28; C08J 5/18; C08J 2201/04; C08J 2205/044; C08J 2379/08; C08J 7/123;
(Continued)

(56) References Cited

U.S. PATENT DOCUMENTS

| 4,440,643 A | 4/1984 | Makino et al. |
| 2003/0018094 A1 | 1/2003 | Ohya et al. |

(Continued)

FOREIGN PATENT DOCUMENTS

| EP | 2 557 110 A1 | 2/2013 |
| JP | 2001-205058 A | 7/2001 |

(Continued)

OTHER PUBLICATIONS

International Search Report dated Oct. 3, 2017, corresponding to International Patent Application No. PCT/JP2017/026935, filed on Jul. 25, 2017, 2 pages.

(Continued)

*Primary Examiner* — Kara B Boyle
(74) *Attorney, Agent, or Firm* — Mintz Levin Cohn Ferris Glovsky and Popeo PC

(57) ABSTRACT

The present invention pertains to a porous polyimide film production method and a porous polyimide film produced using said method, said method including: a step (1) in which a poly(amic acid) solution comprising 40%-97% by mass organic polar solvent and 3%-60% by mass poly(amic acid) having an intrinsic viscosity, comprising tetracarboxylic acid units and diamine units, of 1.0-3.0 is cast in film form and immersed in or caused to come in contact with a (Continued)

coagulating solvent having water as an essential component thereof, and a porous film of poly(amic acid) is produced; and a step (2) in which the porous film of poly(amic acid) obtained in said step is heat treated and imidized. Shrinkage in the film longitudinal direction and transverse direction after heat treatment is suppressed to no more than 8% for each direction and the speed of temperature increase in a temperature range of at least 200° C. during the heat treatment is at least 25° C./min.

5 Claims, 5 Drawing Sheets

(52) U.S. Cl.
CPC ...... *C08J 2201/04* (2013.01); *C08J 2205/044* (2013.01); *C08J 2379/08* (2013.01)

(58) Field of Classification Search
CPC ........ C08J 9/36; C08G 73/10; C08G 73/1085; C08G 73/1007; C08G 73/1032; C08G 73/1067
See application file for complete search history.

(56) References Cited

U.S. PATENT DOCUMENTS

| | | |
|---|---|---|
| 2011/0318556 A1 | 12/2011 | Ohya et al. |
| 2012/0207999 A1 | 8/2012 | Ohya et al. |
| 2013/0045355 A1 | 2/2013 | Ohya et al. |

FOREIGN PATENT DOCUMENTS

| | | | |
|---|---|---|---|
| JP | 2004359860 A | * | 12/2004 |
| JP | 2005-38687 | | 2/2005 |
| JP | 2011-1434 A | | 1/2011 |
| JP | 2011-219586 A | | 11/2011 |
| WO | 2010/038873 A1 | | 4/2010 |
| WO | 2011/043467 A1 | | 4/2011 |
| WO | 2011/125988 A1 | | 10/2011 |

OTHER PUBLICATIONS

Extended European Search Report dated Feb. 3, 2020 corresponding to EP 17834358.8 filed Jul. 25, 2017; 7 pages.

* cited by examiner (a)

(b)

Example 3

Surface layer (b)

Surface layer (a)

Cross section

Example 6

Surface layer (b)

Surface layer (a)

Cross section

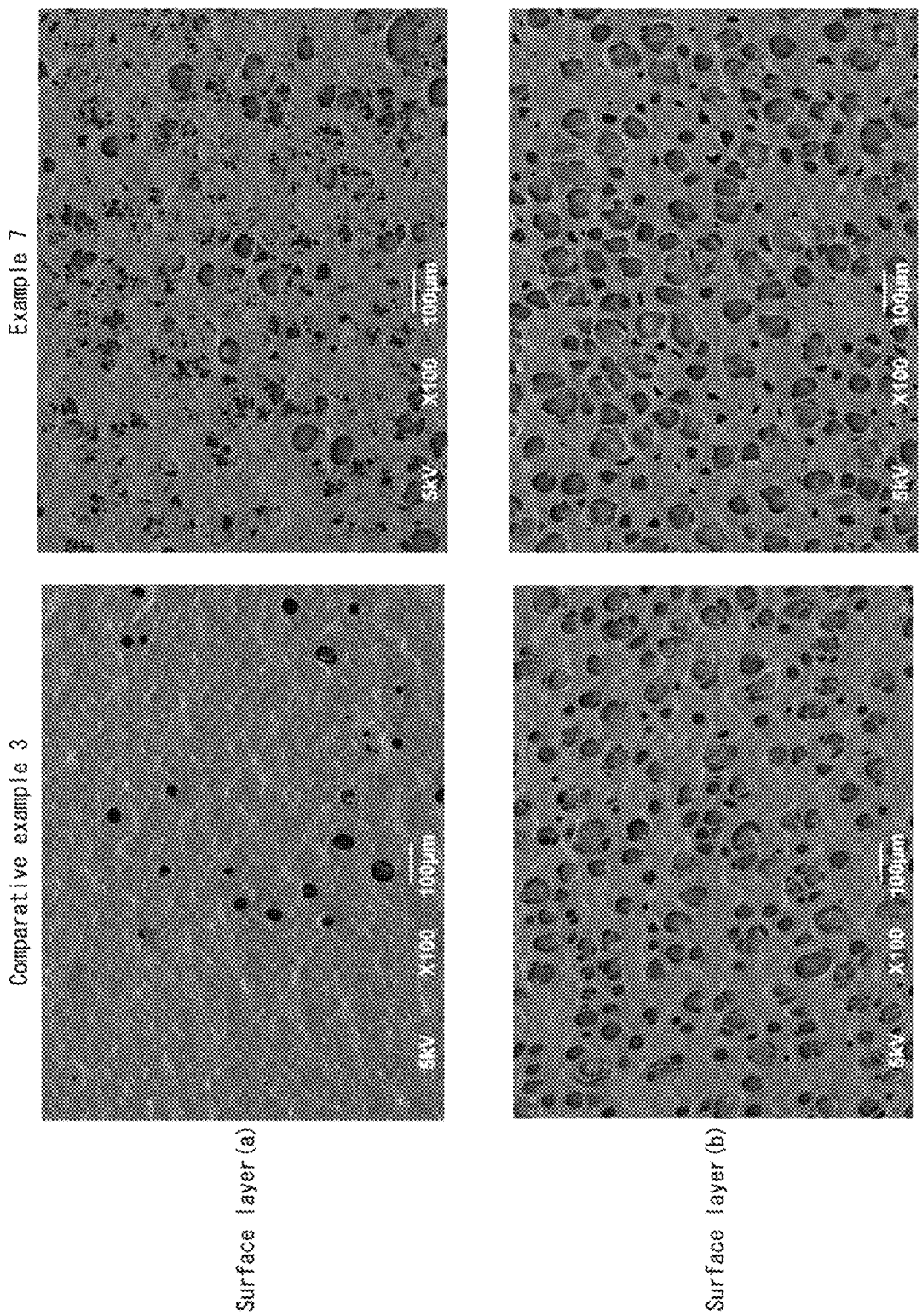

POROUS POLYIMIDE FILM PRODUCTION METHOD AND POROUS POLYIMIDE FILM PRODUCED USING SAID METHOD

FIELD

The present invention relates to a method for producing a porous polyimide film, and a porous polyimide film produced using the method.

BACKGROUND

A producing method of a porous polyimide film having high air permeability and having macrovoids inside has been reported (PTL 1 and 2).

PRIOR ART DOCUMENTS

Patent Literature

PTL 1: WO2010/038873
PTL 2: WO2011/125988

DISCLOSURE OF THE INVENTION

Problems to be Solved by the Invention

According to the method of PTL 1, a desired porous polyimide film is produced from a composition containing a poly(amic acid) (A) constituted with a tetracarboxylic acid unit and a diamine unit, and an organic compound (B) having a polar group such as benzoic acid.

According to the method of PTL 2, a desired porous polyimide film is produced from a composition containing a poly(amic acid) (A) constituted with a tetracarboxylic acid unit and a diamine unit, and an organic compound (B) having a polar group such as benzoic acid or a polymer (C) having a polar group in the side chain, such as polyacrylonitrile.

An object of the present invention is to provide a method for producing more easily and efficiently a porous polyimide film having high air permeability and macrovoids inside, without adding an organic compound having a polar group, or a polymer having a polar group, either of which was indispensable in the production of a porous polyimide film according to PTL 1 and 2.

Means for Solving the Problems

The present invention includes the following aspects.
[1]
A method for producing a porous polyimide film, the method comprising the steps of:
(1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid); and
(2) imidizing the porous film of a poly(amic acid) obtained in the step (1) by heat treatment, wherein each of the shrinkage ratios in the longitudinal direction and the transverse direction of the film after heat treatment is suppressed to 8% or lower, and the temperature rising rate in the temperature region of 200° C. or higher in the heat treatment is 25° C./min or higher,
wherein the porous polyimide film is a three-layer structure porous polyimide film having two surface layers (a) and (b), and a macrovoid layer sandwiched between the surface layers (a) and (b),
the macrovoid layer has partition walls bonded to the surface layers (a) and (b), and a plurality of macrovoids surrounded by the partition walls and the surface layers (a) and (b) and having a mean pore size in the film plane direction of from 10 to 500 μm,
the partition walls of the macrovoid layer have a thickness of 0.1 μm to 50 μm,
at least one partition walls have one or a plurality of pores communicating adjacent macrovoids,
each of the surface layers (a) and (b) has a thickness of 0.1 μm to 50 μm,
at least one of the surface layers (a) and (b) has a plurality of fine pores having an average pore diameter of more than 5 μm and not more than 200 μm, while the other has a plurality of fine pores having an average pore diameter of 0.01 μm to 200 μm;
the surface opening ratio of at least one of the surface layer is not less than 10%, while that of the other surface layer is not less than 5%;
the fine pores in the surface layers (a) and (b) communicate with the macrovoids; and
the porous polyimide film has a total film thickness of 5 μm to 500 μm, the Gurley value being not more than 20 sec/100 cc, and a porosity being 60% to 95%.
[2]
The method for producing a porous polyimide film according to [1], wherein the poly(amic acid) comprises at least one tetracarboxylic dianhydride selected from the group consisting of biphenyltetracarboxylic dianhydride and pyromellitic dianhydride; and at least one diamine selected from the group consisting of benzenediamine, diaminodiphenyl ether and bis(aminophenoxy)phenyl.
[3]
The method for producing a porous polyimide film according to [1] or [2], wherein the coagulating solvent comprising water as an essential component is water, or a mixed solution of 5% by mass or more and less than 100% by mass of water, and more than 0% by mass to 95% by mass or less, of an organic polar solvent.
[4]
The method for producing a porous polyimide film according to any one of [1] to [3], further comprising the step of subjecting at least one surface of the porous polyimide film obtained in the step (2) to plasma treatment.
[5]
A method for producing a porous polyimide film, the method comprising the steps of:
(1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid);
(2) imidizing the porous film of a poly(amic acid) obtained in the step (1) by heat treatment, and
(3) subjecting at least one surface of the porous polyimide film obtained in the step (2) to plasma treatment, wherein the porous polyimide film is a three-layer structure porous polyimide film having two surface layers (a) and (b), and a macrovoid layer sandwiched between the surface layers (a) and (b), the macrovoid layer has partition walls bonded to the surface layers (a) and (b), and a plurality of macrovoids surrounded by the partition walls and the surface layers (a) and (b) and having a mean pore size in the film plane direction of from 10 to 500 μm, the partition walls of the macrovoid layer have a thickness of 0.1 μm to 50 μm, at least one partition walls have one or a plurality of pores communicating adjacent macrovoids, each of the surface layers (a) and (b) has a thickness of 0.1 μm to 50 μm, at least one of the surface layers (a) and (b) has a plurality of fine pores having an average pore diameter of more than 5 μm and not more than 200 μm, while the other has a plurality of fine pores having an average pore diameter of 0.01 μm to 200 μm;

the surface opening ratio of at least one of the surface layer is not less than 10%, while that of the other surface layer is not less than 5%;

the fine pores in the surface layers (a) and (b) communicate with the macrovoids; and the porous polyimide film has a total film thickness of 5 μm to 500 μm, the Gurley value being not more than 20 sec/100 cc, and a porosity being 60% to 95%.

[6]

A porous polyimide film produced by the method comprising the steps of:

(1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid); and (2) imidizing the porous film of a poly(amic acid) obtained in the step (1) by heat treatment, wherein each of the shrinkage ratios in the longitudinal direction and the transverse direction of the film after heat treatment is suppressed to 8% or lower, and the temperature rising rate in the temperature region of 200° C. or higher in the heat treatment is 25° C./min or higher, wherein the porous polyimide film is a three-layer structure porous polyimide film having two surface layers (a) and (b), and a macrovoid layer sandwiched between the surface layers (a) and (b), the macrovoid layer has partition walls bonded to the surface layers (a) and (b), and a plurality of macrovoids surrounded by the partition walls and the surface layers (a) and (b) and having a mean pore size in the film plane direction of from 10 to 500 μm, the partition walls of the macrovoid layer have a thickness of 0.1 μm to 50 μm, at least one partition walls have one or a plurality of pores communicating adjacent macrovoids, each of the surface layers (a) and (b) has a thickness of 0.1 μm to 50 μm, at least one of the surface layers (a) and (b) has a plurality of fine pores having an average pore diameter of more than 5 μm and not more than 200 μm, while the other has a plurality of fine pores having an average pore diameter of 0.01 μm to 200 μm;

the surface opening ratio of at least one of the surface layer is not less than 10%, while that of the other surface layer is not less than 5%;

the fine pores in the surface layers (a) and (b) communicate with the macrovoids; and the porous polyimide film has a total film thickness of 5 μm to 500 μm, the Gurley value being not more than 20 sec/100 cc, and a porosity being 60% to 95%.

[7]

A porous polyimide film produced by the method comprising the steps of:

(1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid);

(2) imidizing the porous film of a poly(amic acid) obtained in the step (1) by heat treatment, and (3) subjecting at least one surface of the porous polyimide film obtained in the step (2) to plasma treatment, wherein the porous polyimide film is a three-layer structure porous polyimide film having two surface layers (a) and (b), and a macrovoid layer sandwiched between the surface layers (a) and (b), the macrovoid layer has partition walls bonded to the surface layers (a) and (b), and a plurality of macrovoids surrounded by the partition walls and the surface layers (a) and (b) and having a mean pore size in the film plane direction of from 10 to 500 μm, the partition walls of the macrovoid layer have a thickness of 0.1 μm to 50 μm, at least one partition walls have one or a plurality of pores communicating adjacent macrovoids, each of the surface layers (a) and (b) has a thickness of 0.1 μm to 50 μm, at least one of the surface layers (a) and (b) has a plurality of fine pores having an average pore diameter of more than 5 μm and not more than 200 μm, while the other has a plurality of fine pores having an average pore diameter of 0.01 μm to 200 μm;

the surface opening ratio of at least one of the surface layer is not less than 10%, while that of the other surface layer is not less than 5%;

the fine pores in the surface layers (a) and (b) communicate with the macrovoids; and the porous polyimide film has a total film thickness of 5 μm to 500 μm, the Gurley value being not more than 20 sec/100 cc, and a porosity being 60% to 95%.

The method of the above [1] is referred to as the "production method A of the present invention" hereinbelow. The method of the above [5] is referred to as the "production method B of the present invention" hereinbelow. Both of them are also referred to as the "production method of the present invention". In addition, the porous polyimide film of the above [6] to [8] is referred to as the "porous polyimide film of the present invention" hereinbelow.

Effects of the Invention

A porous polyimide film produced by the method of the present invention has advantages, such as:

1) The cross section structure of the film is mostly symmetrical, so that it is very easy to use it for various flat film materials, 2) A large porosity can be obtained, so that the dielectric constant may be lowered, for example, when it is used as an insulating substrate,
3) Since together with both the surfaces and a support layer it has communication pores extending continuously from one surface to the other surface, filling with or transportation of a material is easy,
4) Since it has macrovoids, the filling amount with a material can be increased,
5) The smoothness of both the surfaces is excellent, and
6) Since both the surface layers and the supporting portion have mostly a ladder structure, the strength is rather high as compared to the bulk density, and despite the high porosity, it exhibits high load bearing ability against a compression stress in the film thickness direction, high dimensional stability, and also a small rate of change of the film thickness through application of a compression stress of 0.5 MPa at 250° C. for 15 min. By the method of the present invention, a porous polyimide film having the above excellent properties may be easily and efficiently produced.

BRIEF DESCRIPTION OF DRAWINGS

FIG. 5 is scanning electron micrographs of the surface layer (a), and the surface layer (b) of the porous polyimide films obtained in Comparative Example 3 and Example 7.

DESCRIPTION OF EMBODIMENTS

Figure 1:
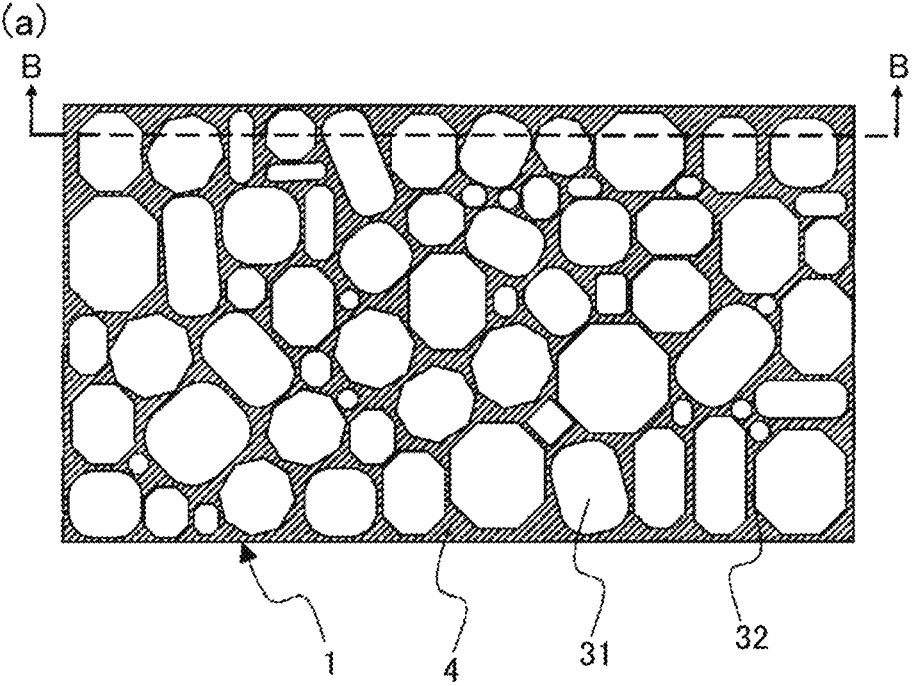
FIG. 1(a) is a sectional plan view of a preferred embodiment of a porous polyimide film of the present invention.
FIG. 1(b) is a sectional view along the line B-B in FIG. 1(a).
Figure 1:
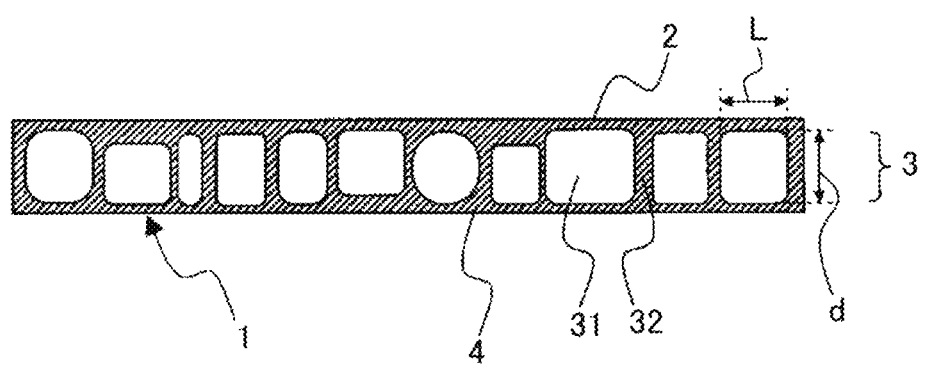

1. Regarding Porous Polyimide Film of the Present Invention

Preferable embodiments of a porous polyimide film of the present invention will be described referring to the drawings. FIG. 1(a) is a sectional plan view of a preferred embodiment of a porous polyimide film of the present invention, and FIG. 1(b) is a sectional view along the line B-B in FIG. 1(a). FIG. 2 is an enlarged sectional side view of a preferred embodiment of a porous polyimide film of the present invention.

Figure 2:
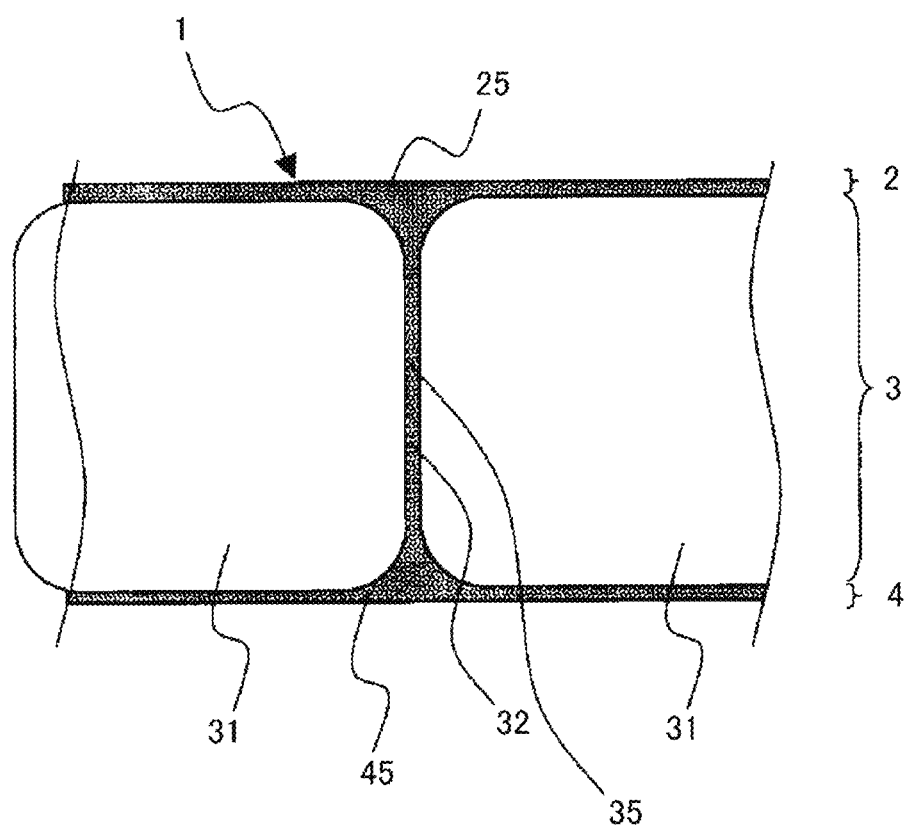
FIG. 2 is an enlarged sectional side view of a preferred embodiment of a porous polyimide film of the present invention.
Figure 3:
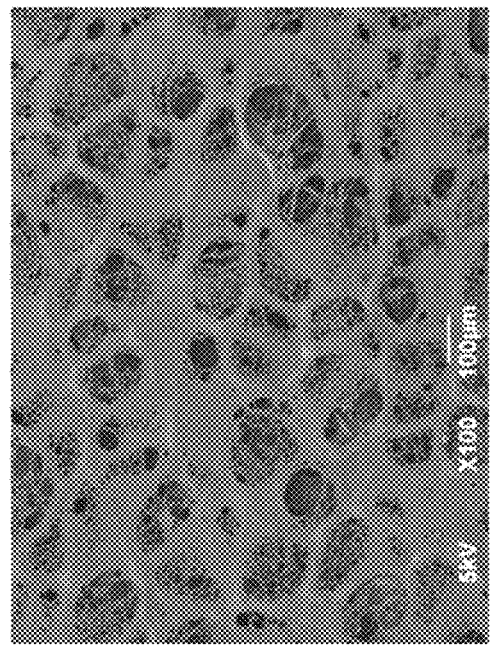
FIG. 3 is scanning electron micrographs of the surface layer (a), the surface layer (b), and a section of the porous polyimide film obtained in Example 3.
Figure 3:
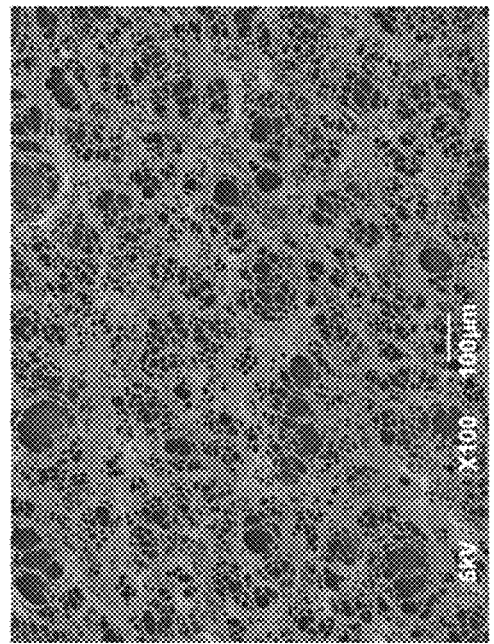
Figure 3:
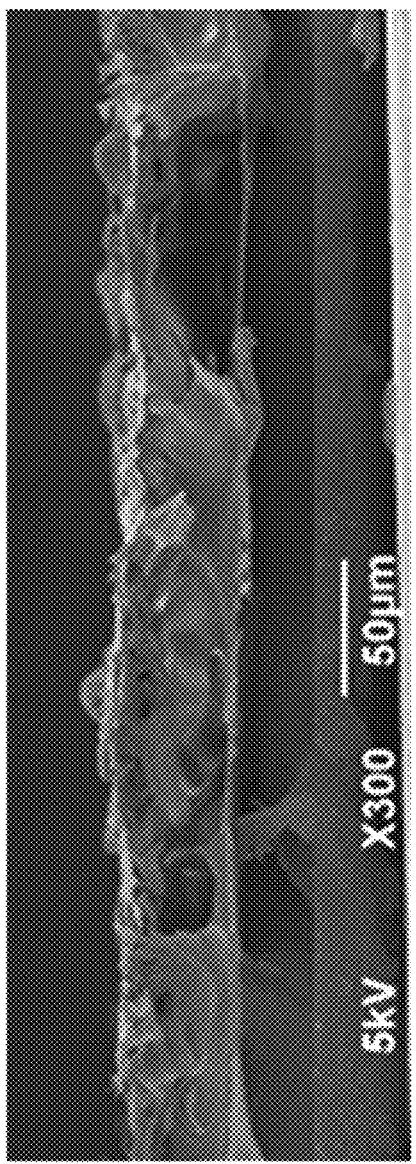
Figure 4:
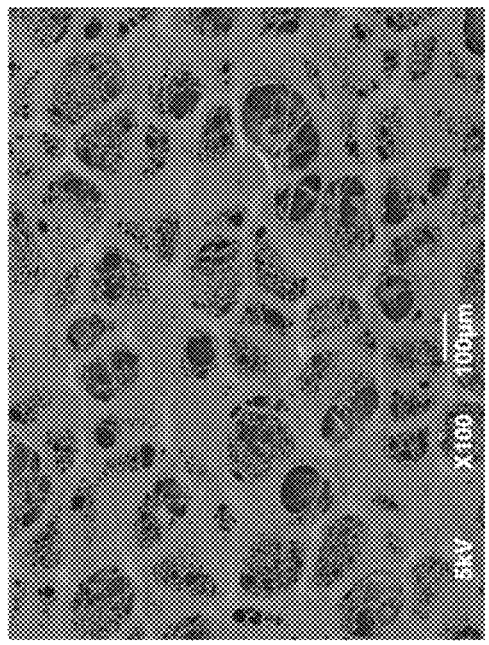
FIG. 4 is scanning electron micrographs of the surface layer (a), the surface layer (b), and a section of the porous polyimide film obtained in Example 6.
Figure 4:
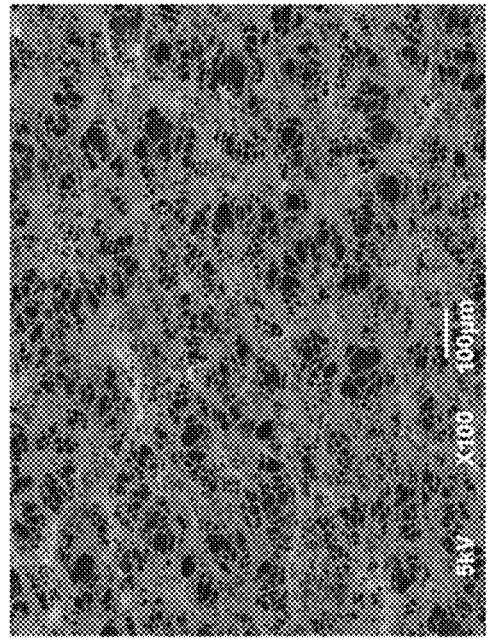
Figure 4:
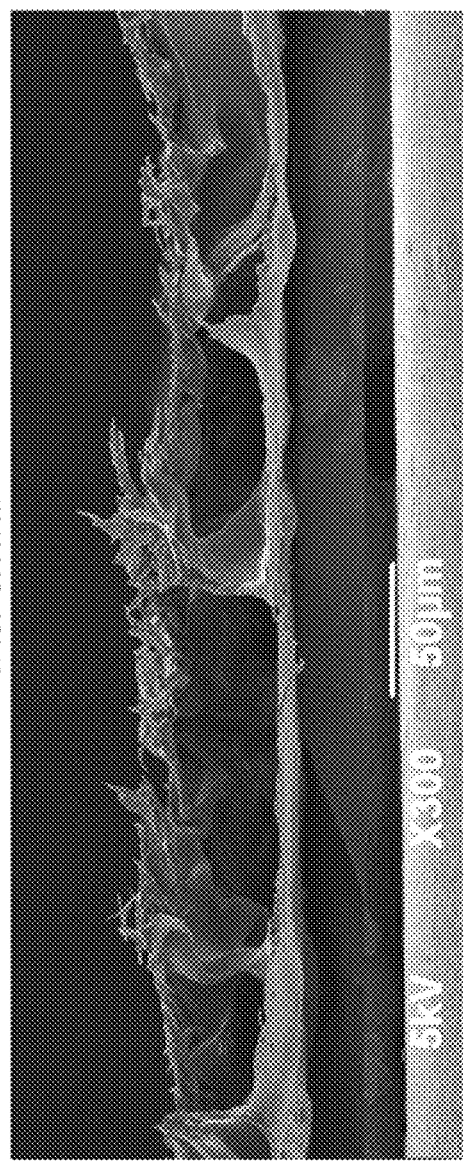

As illustrated in FIGS. 1 and 2, the porous polyimide film 1 of the present invention is a three-layer structure porous polyimide film having two surface layers 2 and 4 (surface layers (a) and (b)), and a macrovoid layer 3 sandwiched between the surface layers 2 and 4.

The thickness of each of the surface layers 2 and 4 is 0.1 to 50 μm, preferably 0.5 to 10 μm from the viewpoint of the strength of the polyimide film, more preferably 1 to 9 μm, further preferably 2 to 8 μm, and especially preferably 2 to 7 μm. From the viewpoint of using the polyimide film as a material for various flat films, it is preferable that the thicknesses of the surface layers 2 and 4 are substantially the same.

The surface layers 2 and 4 have a plurality of fine pores 25 and 45 respectively. In the present invention, the average pore diameter of the fine pores in at least one surface layer is more than 5 μm and 200 μm or less, preferably 5.5 to 200 μm, more preferably 7 to 200 μm, further preferably from 10 to 200 μm, and especially preferably from 10 to 100 μm. In this case, the average pore diameter of the fine pores in the other surface layer is 0.01 to 200 μm, preferably 1 to 200 μm, more preferably 5.5 to 200 μm, further preferably 10 to 100 μm, and especially preferably 15 to 70 μm. It is preferable that each of the surface layers 2 and 4 has a plurality of fine pores which average pore diameter is over 5 μm but not greater than 200 μm.

The surface opening ratio of one of the surface layers 2 and 4 is 10% or more, preferably 15% or more, and more preferably 20% or more, and the surface opening ratio of the other surface opening ratio is 5% or more, preferably 10% or more, and more preferably 20% or more. Such surface opening ratios are advantageous for improving the mass transfer between the outside of a porous polyimide film and the macrovoids.

The maximum pore diameter of the fine pores 25 and 45 is preferably 500 μm or less, more preferably 0.1 to 500 μm, and further preferably 0.1 to 200 μm. The fine pores 25 and 45 communicate with the macrovoids 31.

As described above, owing to the presence of the communicating pores extending from one surface to the other surface, filling with or transfer of a material is facile, and a polyimide film of the present invention is excellent in permeability of a material such as a gas. On the other hand, since the average pore diameter of the fine pores formed on the surface of the film is small, and only a material having a predetermined size can be passed through, a polyimide film of the present invention has a filtering function. Further, since the average pore diameter of the fine pores formed on the film surface is small, the film surface of a polyimide film of the present invention is excellent in smoothness.

A macrovoid layer 3 has a plurality of macrovoids 31 and a partition wall 32 separating adjacent macrovoids 31. A macrovoid 31 is a space surrounded by the partition walls 32 and the surface layers 2 and 4, and the average pore diameter in the film plane direction is 10 to 500 μm, preferably 10 to 100 μm, and more preferably 10 to 80 μm. A cross section of the macrovoid layer 3 cut parallel to the film plane direction is schematically depicted in FIG. 1(a), which has a honeycomb structure or a structure similar thereto, and a plurality of macrovoids having a predetermined pore diameter are present side by side separated by the partition walls. In other words, a polyimide film of the present invention has a so-called "honeycomb sandwich structure". In this regard, a "honeycomb structure" means herein merely a structure in which a large number of individually divided cell spaces are densely packed, and not limited to a structure in which the cross section of cell spaces are accurately hexagonal.

With the macrovoid 31, a polyimide film of the present invention has a large space and the porosity is high. Therefore, when it is used, for example, as an insulating substrate, the dielectric constant may be lowered, and when the voids are filled with a material, its filling amount may be increased.

The thickness of the partition wall 32 separating the adjacent macrovoids 31 from each other is 0.1 to 50 μm, preferably 1 to 15 μm from the viewpoints of the strength of the polyimide film 1 and the mutual communication capacity between the adjacent macrovoids 31, more preferably 2 to 12 μm, further preferably 3 to 10 μm, and especially preferably 4 to 8 μm. The thicknesses of the partition walls 32 and the surface layers 2 and 4 are preferably substantially the same.

As depicted in FIG. 1(b), a polyimide film of the present invention has a plurality of partition walls, and at least one partition wall has one or plural pores 35. The average pore diameter of the pores 35 is not particularly limited, but is preferably 0.01 to 100 µm, more preferably 0.01 to 50 µm, further preferably 0.01 to 20 µm, still further preferably 0.01 to 10 µm, and especially preferably 0.02 to 2 µm.

As described above, since a polyimide film of the present invention has communicating macrovoids, filling with a material or transfer thereof in the film plane direction is easy, and therefore it is excellent in permeability of a material. On the other hand, since the average pore diameter of fine pores formed in the partition walls is small, it is possible to trap the material in the macrovoid.

As depicted in FIGS. 1(b) and 2, the partition walls 32 are bonded to the surface layers 2 and 4. The partition wall 32 plays a role of separating adjacent macrovoids 31 from each other, and also serves as a support portion for supporting the surface layers 2 and 4. Therefore, a polyimide film of the present invention is resistant to compressive stress in the thickness direction of the film despite the high porosity, and has high dimensional stability.

In the cross section of a polyimide film of the present invention cut perpendicularly to the film plane direction, the partition walls 32 and the surface layers 2 and 4 are configured in a ladder shape. In other words, the partition walls 32 are formed in a substantially vertical direction with respect to the film plane direction at substantially regular intervals, and are bonded to the surface layers 2 and 4.

From the viewpoint of permeability of a material, in the cross section of a polyimide film of the present invention cut perpendicularly to the film plane direction, the cross-sectional area of macrovoids having an average pore diameter in the film plane direction of 10 to 500 µm is preferably 50% or more with respect to the cross-sectional area of the film, more preferably 60% or more, further preferably 70% or more, and especially preferably 75% or more, and preferably 98% or less, more preferably 95% or less, further preferably 90% or less, and especially preferably 85% or less.

Further, from the viewpoints of permeability of a material, light weight, and retention of film structure, in the cross section of a polyimide film of the present invention cut perpendicularly to the film plane direction, the ratio (L/d) of the length (L) in the film plane direction to the length (d) in the film thickness direction of macrovoids having an average pore diameter in the film plane direction of 10 to 500 µm is preferably in a range of 0.5 to 3, more preferably L/d=0.8 to 3, further preferably L/d=1 to 3, and especially preferably L/d=1.2 to 3. The number percentage of the macrovoids satisfying such L/d range is preferably 60% or more, more preferably 70% or more, and further preferably 75 to 100%. In this regard, the length (d) in the film thickness direction of a macrovoid means the maximum length of macrovoids in the film thickness direction, and the length (L) in the film plane direction of a macrovoid means the maximum length of macrovoids in the film plane direction.

The total film thickness of a polyimide film of the present invention is 5 to 500 µm, and from the viewpoint of mechanical strength preferably 10 µm or more, more preferably 20 µm or more, and further preferably 25 µm or more, and preferably 300 µm or less, more preferably 100 µm or less, further preferably 50 µm or less, and especially preferably 40 µm or less.

Meanwhile, the porosity of a polyimide film of the present invention is 60 to 95%, and from the viewpoints of permeability of a material, mechanical strength, and retention of the film structure, it is preferably 70 to 92%, more preferably 71 to 85%, and further preferably 71 to 80%.

From the viewpoint of air permeability, the Gurley value of a polyimide film of the present invention (the number of seconds required for 100 cc of air to pass through a film under a pressure of 0.879 g/m$^2$) is preferably 20 sec/100 cc or less, more preferably 10 sec/100 cc or less, further preferably 5 sec/100 cc or less, still further preferably 2 sec/100 cc or less, and especially preferably 0.5 sec/100 cc or less. The lower limit value is not particularly restricted, but is preferably not less than the measurement limit. The Gurley value can be measured according to JIS P8117. A polyimide film of the present invention is extremely superior in air permeability.

The change rate of the film thickness of a polyimide film of the present invention through application of a compression stress of 0.5 MPa at 250° C. for 15 min is preferably 5% or less, more preferably 3% or less, and further preferably 0 to 1%. Further, the dimensional stability in terms of dimensional change in the film plane direction according to ASTM D1204 at 200° C. for 2 hours is preferably within ±1%, more preferably within ±0.8%, and further preferably within ±0.5%.

From the viewpoints of heat resistance, and dimensional stability at high temperature, a polyimide film of the present invention has preferably a glass transition temperature of 240° C. or higher, or does not have a clear transition temperature at 300° C. or higher.

A porous polyimide film of the present invention is a porous polyimide film containing as a main component a polyimide obtained from a tetracarboxylic dianhydride and a diamine, and is preferably a porous polyimide film consisting of a polyimide obtained from a tetracarboxylic dianhydride and a diamine.

The tetracarboxylic dianhydride may be any tetracarboxylic dianhydride, selected as appropriate according to the properties desired. Specific examples of tetracarboxylic dianhydrides include biphenyltetracarboxylic dianhydrides such as pyromellitic dianhydride, 3,3',4,4'-biphenyltetracarboxylic dianhydride (s-BPDA) and 2,3,3',4'-biphenyltetracarboxylic dianhydride (a-BPDA), oxydiphthalic dianhydride, diphenylsulfone-3,4,3',4'-tetracarboxylic dianhydride, bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride, bis(3,4-dicarboxyphenyl)methane dianhydride, 2,2-bis(3,4-dicarboxyphenyl)propane dianhydride, p-phenylenebis(trimellitic acid monoester acid anhydride), p-biphenylenebis(trimellitic acid monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride, 2,3,6,7-naphthalenetetracarboxylic dianhydride, 1,4,5,8-naphthalenetetracarboxylic dianhydride, 4,4'-(2,2-hexafluoroisopropylidene)diphthalic dianhydride, and the like. Also preferably used is an aromatic tetracarboxylic acid such as 2,3,3',4'-diphenylsulfonetetracarboxylic acid. These may be used alone or in appropriate combinations of two or more.

Particularly preferred among these are at least one type of aromatic tetracarboxylic dianhydride selected from the group consisting of biphenyltetracarboxylic dianhydride and pyromellitic dianhydride. As a biphenyltetracarboxylic dianhydride there may be suitably used 3,3',4,4'-biphenyltetracarboxylic dianhydride.

As diamine, any diamine may be used. Specific examples of diamines include the following:

1) Benzenediamines with one benzene nucleus, such as 1,4-diaminobenzene(paraphenylenediamine), 1,3-diaminobenzene, 2,4-diaminotoluene and 2,6-diaminotoluene;

2) diamines with two benzene nuclei, including diaminodiphenyl ethers such as 4,4'-diaminodiphenyl ether and 3,4'-diaminodiphenyl ether, and 4,4'-diaminodiphenylmethane, 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine, 2,2'-dimethylbenzidine, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenylsulfone, 3,4'-diaminodiphenylsulfone, 4,4'-diaminodiphenylsulfone, 3,3'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide and 4,4'-diaminodiphenyl sulfoxide;

3) diamines with three benzene nuclei, including 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenyl sulfide)benzene, 1,3-bis(4-aminophenyl sulfide)benzene, 1,4-bis(4-aminophenyl sulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene and 1,4-bis[2-(4-aminophenyl)isopropyl]benzene;

4) diamines with four benzene nuclei, including 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane and 2,2-bis[4-(4-aminophenoxy)phenyl]-1,1,1,3,3,3-hexafluoropropane.

These may be used alone or in mixtures of two or more. The diamine used may be appropriately selected according to the properties desired.

Preferred among these are aromatic diamine compounds, with 3,3'-diaminodiphenyl ether, 3,4'-diaminodiphenyl ether, 4,4'-diaminodiphenyl ether, paraphenylenediamine, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene and 1,4-bis(3-aminophenoxy)benzene being preferred for use. Particularly preferred is at least one type of diamine selected from the group consisting of benzenediamines, diaminodiphenyl ethers and bis(aminophenoxy)phenyl.

From the viewpoint of heat resistance and dimensional stability under high temperature, the porous polyimide film is preferably formed from a polyimide obtained by combination of a tetracarboxylic dianhydride and a diamine, having a glass transition temperature of 240° C. or higher, or without a distinct transition point at 300° C. or higher.

From the viewpoint of heat resistance and dimensional stability under high temperature, the porous polyimide film of the present invention is preferably a porous polyimide film comprising one of the following aromatic polyimides:

(i) an aromatic polyimide comprising at least one tetracarboxylic acid unit selected from the group consisting of biphenyltetracarboxylic acid units and pyromellitic acid units, and an aromatic diamine unit, (ii) an aromatic polyimide comprising a tetracarboxylic acid unit and at least one type of aromatic diamine unit selected from the group consisting of benzenediamine units, diaminodiphenyl ether units and bis(aminophenoxy)phenyl units, and/or, (iii) an aromatic polyimide comprising at least one type of tetracarboxylic acid unit selected from the group consisting of biphenyltetracarboxylic acid units and pyromellitic acid units, and at least one type of aromatic diamine unit selected from the group consisting of benzenediamine units, diaminodiphenyl ether units and bis(aminophenoxy)phenyl units.

A porous polyimide film of the present invention is excellent in permeability of a material such as a gas, and therefore may be suitably used for applications such as a gas filter, a liquid filter, and a ventilation part.

In addition, since a polyimide is superior to other plastics in heat resistance, a porous polyimide film of the present invention may be used even in a service temperature range of 250° C. or higher. Specific examples thereof include a protective film for an acoustic part such as a microphone of a mobile phone, and even when it is thermally affected in soldering, it will not be destroyed. It can also be used as a heat resistant filter. The heretofore used heat resistant filter made of an aramid nonwoven fabric is thermally deteriorated by use and the binder contained therein may be carbonized to become a source of dust, but a heat resistant filter using a porous polyimide film of the present invention does not cause such a problem. It may also be used for a dustproof heat resistant filter for a hot air circulation line in a car body painting booth.

2. Regarding the Production Method A of the Present Invention

An embodiment of the method for producing a porous polyimide film of the present invention comprises the steps of:

(1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid); and (2) imidizing the porous film of a poly(amic acid) obtained in the above step by heat treatment, wherein each of the shrinkage ratios in the longitudinal direction and the transverse direction of the film after heat treatment is suppressed to 8% or lower, and the temperature rising rate in the temperature region of 200° C. or higher in the heat treatment is 25° C./min or higher. This method is hereinafter also referred to as the "production method A of the present invention".

A poly(amic acid) is a polyimide precursor constituted with a tetracarboxylic acid unit and a diamine unit, or a partially imidized polyimide precursor therefrom. A poly (amic acid) may be obtained by polymerizing a tetracarboxylic dianhydride, and a diamine. By thermal imidization or chemical imidization of a poly(amic acid) it may be converted to a polyimide through ring closure. A poly(amic acid) used in the present invention is preferably produced by thermal imidization. The imidization rate is preferably about 80% or more, more preferably 85% or more, further preferably 90% or more, and still further preferably 95% or more.

As a tetracarboxylic dianhydride and a diamine, those listed in 1. above may be used. A poly(amic acid) used in the method for producing a porous polyimide film of the present invention is obtained preferably from at least one kind of tetracarboxylic dianhydride selected from the group consisting of biphenyltetracarboxylic dianhydride, and pyromellitic dianhydride, and at least one kind of diamine selected from the group consisting of benzenediamine, diaminodiphenyl ether, and bis(aminophenoxy)phenyl.

An arbitrary organic polar solvent may be used as a solvent for polymerizing a poly(amic acid), and examples of a usable organic polar solvent may include p-chlorophenol, o-chlorophenol, N-methyl-2-pyrrolidone (NMP), pyridine, N,N-dimethylacetamide (DMAc), N,N-dimethylformamide, dimethyl sulfoxide, tetramethylurea, phenol, and cresol. In particular, N-methyl-2-pyrrolidone (NMP), or N,N-dimethylacetamide (DMAc) may be favorably used.

A poly(amic acid) may be produced by an arbitrary method using a tetracarboxylic dianhydride, a diamine, the organic polar solvent, etc. For example, a poly(amic acid) solution may be prepared by reacting a tetracarboxylic dianhydride and a diamine quasi equimolarly preferably at a temperature of about 100° C. or less, more preferably 80° C. or less, further preferably 0 to 60° C., and especially preferably 20 to 60° C., and preferably for about 0.2 hours or more, and more preferably 0.3 to 60 hours.

In preparing the poly(amic acid) solution, an optional molecular weight adjusting component may be added to the reaction solution with a purpose for adjusting the molecular weight.

The limiting viscosity number of a poly(amic acid) used in the production method A of the present invention is 1.0 to 3.0, preferably 1.3 to 2.8, and more preferably 1.4 to 2.6. When the limiting viscosity number is too small, the film may be broken due to insufficient mechanical strength or the like in the production process of the film, which is not preferable. Further, when the limiting viscosity number is too high, shrinkage of the film may be so intense in the thermal imidization step to cause breakage, which is also not preferable. By using a poly(amic acid) having a limiting viscosity number in the above described numerical range, a porous polyimide film of the present invention may be favorably produced. In this regard, there is a causal relationship between the polymer molecular weight and the limiting viscosity number, and as the polymer molecular weight increases, the limiting viscosity number rises.

A poly(amic acid) in which an amic acid is partially imidized may be also used insofar as the present invention is not adversely affected.

A poly(amic acid) solution is composed of 3 to 60% by mass of a poly(amic acid) and 40 to 97% by mass of an organic polar solvent. When the content of a poly(amic acid) is less than 3% by mass, the film strength decreases when a porous polyimide film is produced, and when it exceeds 60% by mass, the permeability of a material of a porous polyimide film decreases. The content of a poly(amic acid) in a poly(amic acid) solution is preferably 4 to 40% by mass, more preferably 5 to 20% by mass, and further preferably 6 to 10% by mass.

A poly(amic acid) solution may be a solution obtained by polymerizing a tetracarboxylic dianhydride and a diamine in the presence of an organic polar solvent, or may be a solution obtained by dissolving a poly(amic acid) in an organic polar solvent.

The solution viscosity of a poly(amic acid) solution is preferably 10 to 10,000 poise (1 to 1,000 Pa·s), more preferably 100 to 3,000 poise (10 to 300 Pa·s), further preferably 200 to 2,000 poise (20 to 200 Pa·s), and especially preferably 300 to 1,000 poise (30 to 100 Pa·s) from the viewpoints of ease of casting and film strength.

(Casting)

In the production method A of the present invention, firstly a poly(amic acid) solution is cast into the film-like shape. There is no particular restriction on the casting method, and for example a poly(amic acid) solution is used as a dope solution and the poly(amic acid) solution is cast onto a glass sheet, a stainless steel sheet, or the like using a blade, a T-die, or the like into the film-like shape. Alternatively, a poly(amic acid) solution may be intermittently or continuously cast on a movable continuous belt or drum into the film-like shape to produce continuously short pieces or a long piece of a cast sheet. There is no particular restriction on the belt or drum insofar as it is not affected by a poly(amic acid) solution or a coagulating solution, and for example the belt or the drum may be made of a metal such as stainless steel, or a resin such as polytetrafluoroethylene. Further, a poly(amic acid) solution formed into the film-like shape through a T-die may be directly immersed into a coagulating bath. Further, either or both sides of the cast sheet may be brought into contact with a gas (air, inert gas, etc.) containing water vapor or the like.

(Preparation of Porous Film of Poly(Amic Acid))

Subsequently, the cast sheet is immersed in or brought into contact with a coagulating solvent containing water as an essential component to precipitate a poly(amic acid) to make it porous thereby forming a porous film. The obtained porous film of a poly(amic acid) may be washed and/or dried according to need.

The coagulating solvent containing water as an essential component is preferably water, or a mixed liquid containing water in a range of 5% by mass or more and less than 100% by mass and an organic polar solvent in a range of more than 0% by mass to not more than 95% by mass. It is more preferable to use a coagulating solvent containing water and an organic polar solvent from the viewpoints of safety from fire, etc., production cost, and securance of the homogeneity of a film to be obtained. Examples of an organic polar solvent which may be contained in a coagulating solvent include an alcohol such as ethanol and methanol, and acetone which are a poor solvent of a poly(amic acid). Meanwhile, a good solvent of a poly(amic acid) may be added to the extent that the polymer can be precipitated. Specifically, N-methyl-2-pyrrolidone (NMP), pyridine, N,N-dimethylacetamide (DMAc), and N,N-dimethylformamide may be added.

When a coagulating solvent is a mixture liquid of water and an organic polar solvent, the content of water in the coagulating solvent as 100% by mass is preferably 5% by mass or more and less than 100% by mass, more preferably 20% by mass or more and less than 100% by mass, further preferably 30 to 95% by mass, and especially preferably 45 to 90% by mass. The content of an organic polar solvent in the coagulating solvent as 100% by mass is preferably more than 0% by mass and not more than 95% by mass, more preferably more than 0% by mass and not more than 80% by mass, further preferably 5 to 70% by mass, and especially preferably 10 to 55% by mass.

The temperature of a coagulating solvent may be appropriately selected and used according to the purpose, for example, preferably in a range of −30 to 70° C., more preferably 0 to 60° C., and further preferably 10 to 50° C.

(Thermal Imidization Treatment)

Next, the obtained porous film of a poly(amic acid) is thermally treated for imidization to produce a porous polyimide film. The thermal imidization treatment is performed such that the shrinkage ratio after the treatment each in the longitudinal direction (length direction) and the transverse direction of the film is suppressed to 8% or less, and preferably 5% or less, respectively. Although not particularly limited, the thermal treatment may be performed, for example, by fixing a porous film of a poly(amic acid) to a support using a pin, a chuck, pinch rolls, or the like, and heating it in the atmosphere. It is preferable that the reaction conditions should be appropriately selected with respect to the heating temperature in the range of, for example, 280 to 600° C., and preferably 300 to 550° C., and with respect to the heating time in the range of 1 to 120 min, preferably 2 to 120 min, more preferably 3 to 90 min, and further preferably 5 to 30 min.

In the production method A of the present invention, in the thermal imidization treatment, the temperature rising rate in a temperature range of 200° C. or higher is 25° C./min or more, and preferably 50° C./min or more. Although it is not particularly necessary to limit the upper limit value of the temperature rising rate, when the upper limit value of the temperature rising rate is established, it is 50 to 500° C./min, preferably 50 to 400° C./min, more preferably 70 to 300° C./min, and further preferably 120 to 200° C./min. By heating at the above-mentioned temperature rising rate in the temperature range of 200° C. or higher where the imidization reaction occurs remarkably, the surface opening ratio and the pore diameter are greatly enhanced, and a porous polyimide film of the present invention with greatly improved permeability of a material such as a gas may be obtained.

The porosity, film thickness, average pore diameter in the surface, maximum pore diameter, average pore diameter at the central portion, and the like of a porous polyimide film of the present invention may be appropriately designed by selecting appropriately the type of polymer used, the polymer concentration, viscosity, organic solution, etc. of a polymer solution, the coagulation conditions (kind of solvent substitution rate adjusting layer, temperature, coagulating solvent, etc.), and the like.

In the production method A of the present invention, the porous polyimide film obtained in the above imidization step may be subjected to a surface treatment, such as a corona discharge treatment, a plasma discharge treatment including a low temperature plasma discharge, and an atmospheric pressure plasma discharge, and a chemical etching, on at least one side of the film according to the purpose. The surface layers (a) and/or (b) may be used after machining. These treatments may be carried out according to a method well known to those skilled in the art. It is preferable to apply a plasma discharge treatment to at least one side of a porous polyimide film in order to improve the surface opening diameter, surface opening ratio, and hydrophilicity.

3. Regarding the Production Method B of the Present Invention

In another embodiment of the method for producing a porous polyimide film of the present invention comprises the steps of:

(1) producing a porous film of poly(amic acid) by casting a poly(amic acid) solution composed of 3 to 60% by mass of poly(amic acid) having an limiting viscosity number of 1.0 to 3.0 constituted with a tetracarboxylic acid unit and a diamine unit, and 40 to 97% by mass of an organic polar solvent into a film-like shape, and then immersing it in, or bringing it into contact with a coagulating solvent containing water as an essential component;

(2) imidizing the porous film of a poly(amic acid) obtained in the above step by a heat treatment; and (3) applying a plasma treatment to at least one side of the porous polyimide film obtained in the step (2). This method is hereinafter also referred to as "production method B of the present invention".

As raw materials used in the production method B of the present invention, those described in the above 2. may be used. The step (1) of the production method B of the present invention may be carried out in the same manner as the step (1) of the production method of the present invention described in the above 2.

(Thermal Imidization Treatment)

After the step (1), the obtained porous film of a poly(amic acid) is thermally treated for imidization to produce a porous polyimide film. Although not particularly limited, the thermal imidization treatment is performed such that the shrinkage ratio after the treatment each in the longitudinal direction (length direction) and the transverse direction of the film is suppressed to preferably 40% or less, and more preferably 30% or less, respectively. Although not particularly limited, the thermal treatment may be performed, for example, by fixing a porous film of a poly(amic acid) to a support using a pin, a chuck, pinch rolls, or the like, and heating it in the atmosphere. It is preferable that the reaction conditions should be appropriately selected with respect to the heating temperature in the range of, for example, 280 to 600° C., and preferably 300 to 550° C., and with respect to the heating time in the range of 1 to 120 min, preferably 2 to 120 min, more preferably 3 to 90 min, and further preferably 5 to 30 min.

In the production method B of the present invention, the temperature rising rate in the thermal imidization treatment in a temperature range of 200° C. or higher is, although not particularly limited, for example, 1° C./min or more, preferably 5° C./min or more, 10° C./min or more, 15° C./min or more, 20° C./min or more, or 25° C./min or more, and more preferably 50° C./min or more. Although it is not particularly necessary to limit the upper limit value of the temperature rising rate, when the upper limit value of the temperature rising rate is established, it is for example 1 to 500° C./min, preferably 5 to 400° C./min, more preferably 5 to 300° C./min, and further preferably 5 to 200° C./min. By heating at the above-mentioned temperature rising rate in the temperature range of 200° C. or higher where the imidization reaction occurs remarkably, the surface opening ratio and the pore diameter are greatly enhanced, and a porous polyimide film of the present invention with greatly improved permeability of a material such as a gas may be obtained.

The porosity, film thickness, average pore diameter in the surface, maximum pore diameter, average pore diameter at the central portion, and the like of a porous polyimide film of the present invention may be appropriately designed by selecting appropriately the type of polymer used, the polymer concentration, viscosity, organic solution, etc., of a polymer solution, the coagulation conditions (kind of solvent substitution rate adjusting layer, temperature, coagulating solvent, etc.), and the like.

In the production method B of the present invention, the porous polyimide film obtained in the above imidization step is subjected to a surface treatment, such as a corona discharge treatment, and a plasma discharge treatment including a low temperature plasma discharge, and an atmospheric pressure plasma discharge, on at least one side of the film. A plasma discharge treatment may be carried out according to a method well known to those skilled in the art.

In the method of PTL 1 or 2, which is a conventional technique, an organic compound having a polar group, or a polymer having a polar group is used for producing a desired porous polyimide film. They promote the penetration of water into a film-like shape cast sheet of a poly(amic acid) solution composition, and assist in the formation of macrovoids in the polyimide film. Meanwhile, by the production method of the present invention, a desired porous film type polyimide film may be produced without using a material promoting the penetration of water into a film-like shape cast sheet, but by controlling the molecular weight of the poly(amic acid) in a poly(amic acid) solution within a certain range to suppress film shrinkage in the thermal imidization step.

EXAMPLES

The present invention will be described below in more detail with reference to Examples, provided that the present invention is not limited to the Examples.
(Evaluation of Porous Polyimide Film)
1) Film Thickness
A film thickness was measured with a contact type thickness meter.
2) Gas Permeability
A measurement of a Gurley value (the number of seconds required for 100 cc of air to pass through a film under a pressure of 0.879 g/m$^2$) was performed according to JIS P8117.
3) Dimensional Stability
A measurement of dimensional stability was performed at 200° C. for 2 hours according to ASTM D 1204.

4) Average Pore Diameter of a Surface
The average pore diameter was found by measuring the pore area with respect to each of 200 or more openings in a scanning electron micrograph of the surface of the porous film, and by calculating the average pore diameter from the average value of the pore areas according to the following Equation (1) assuming that the shape of pores was a perfect circle.

$$\text{Average Pore Diameter} = 2 \times (Sa/\pi)^{0.5} \qquad \text{[Math. 1]}$$

(In the Equation, Sa means the average value of the pore areas.)
5) Maximum Pore Diameter of a Surface
By measuring the pore area with respect to each of 200 or more openings in a scanning electron micrograph of the surface of the porous film, and the pore diameter was calculated from the pore area assuming that the shape of the pore was a perfect circle. The maximum value thereof was regarded as the maximum pore diameter.
6) Porosity
The porosity was found from the mass per unit area according to the following Equation (2) by measuring the film thickness and the mass of a porous film cut out to a predetermined size.

$$\text{Porosity} = (1-(w/(S \times d \times D))) \times 100 (\%) \qquad \text{[Math. 2]}$$

(wherein, S is the area of the porous film, d is the film thickness, w is the measured mass, and D is the density of the polyimide, respectively. The density of the polyimide is assumed to be 1.37 g/cm$^3$.)
7) Glass Transition Temperature (° C.)
Using a solid viscoelasticity analyzer, a dynamic viscoelasticity was measured in the tensile mode under the conditions of frequency of 10 Hz, strain of 2%, and in a nitrogen gas atmosphere, and a temperature at which the loss tangent exhibited the maximum value in its temperature variance profile was regarded as the transition temperature.
8) Solution Viscosity
The solution viscosity was measured with an E type rotational viscometer. The measurement procedure is shown below.
(i) A polyimide solution prepared in a production example was placed in an air-tight container and kept in a constant temperature bath at 30° C. for 10 hours.
(ii) The polyimide solution prepared in (i) as a measuring target solution was measured using an E type viscometer (manufactured by Tokyo Keiki Inc., (EHD type) cone-plate rotating type for high viscosity, conical rotor: 1° 34'), at a temperature condition of 30±0.1° C. The measurement was repeated three times, and the average value was adopted. In a case where there was a variation of 5% or more among the measured values, two more measurements were conducted and the average value of 5 values was adopted.
9) Limiting Viscosity Number of Poly(Amic Acid)
A limiting viscosity number is synonymous with an intrinsic viscosity, and is a limit value of the reduced viscosity at infinite dilution of the polymer (Reduced viscosity: the ratio $\eta_r/C$ of increase in relative viscosity $\eta_r$ to the mass concentration c of the polymer), or of the inherent viscosity (Inherent viscosity: the ratio of the natural log of the relative viscosity to the mass concentration c of the polymer). Mark-Houwink equation: The molecular weight may be determined from the limiting viscosity number using the following Equation representing the molecular weight dependence of the intrinsic viscosity of a polymer.

$$[\eta] = K^* M_r^n \qquad \text{[Match. 3]}$$

$M_r$ is the molecular weight.

In this regard, the limiting viscosity number was used as an index of a molecular weight because a poly(amic acid) is an unstable substance in the air, and it is difficult to determine a molecular weight by a means such as GPC.

Technically, a measurement of a limiting viscosity number should be carried out using a dilute solution in the θ state using a θ solvent, but it is difficult to prepare a θ solvent, because a poly(amic acid) has strong interaction with solvent molecules. Since it has been reported in the past that, in the case of poly(amic acid), even when a good solvent is used for measurement of the limiting viscosity number, the molecular weight can be calculated by the Mark-Houwink equation, N-methyl-2-pyrrolidone (hereinafter referred to as "NMP") was used as a diluting solvent in Examples.

In Examples, the limiting viscosity number was determined by the following measuring procedure.

(i) An NMP solution of a poly(amic acid) to be measured was prepared such that the solution concentration c became 0.1, 0.075, 0.05, 0.025, and 0.010 [g/dL]. The solution was continuously stirred for 1 week in an anaerobic atmosphere.

(ii) The flow time of NMP was measured in a constant temperature bath at 30° C. using an Ubbelohde dilution viscometer. Successively, the flow time was also measured for each of the solutions prepared in (i). Each measurement was repeated three times, and the average value was adopted. In a case where the variation in the measured time was 3% or more, another two measurements were conducted and the average value of the smallest 3 values was adopted.

(iii) The specific viscosity $\eta_{sp}$ was calculated from a measured value in (ii) above and a graph of the $\eta_{sp}/c$ on the y axis and the c on the x axis was created (Huggins plot). A linear regression analysis was performed on the plotted points using a graph software and the limiting viscosity number was determined from the intercept of the regression line. When R2 of the regression line was 0.900 or less, a solution was prepared again and remeasurement was performed.

10) Film Shrinkage Ratio at the Time of Thermal Imidization

The shrinkage ratio at the time of imidization was measured by the following procedure.

(i) Black points were marked on a poly(amic acid) film before the thermal imidization at an interval of 10 cm with a pigment type black ink.

(ii) The distance between the black points (L1) was measured after the thermal imidization, and the shrinkage ratio was determined by the following Equation.

Shrinkage Ratio (%)=(10−(L1))/10×100  [Math. 4]

Preparation Example 1

Preparation of Poly(Amic Acid) Solution Composition A

Into a 500 mL separable flask, 3,3',4,4'-biphenyltetracarboxylic dianhydride (s-BPDA) as an acid anhydride, and 4,4'-diaminodiphenyl ether as a diamine were weighed out and charged such that the molar ratio of acid anhydride/diamine became 0.992 and the polymer concentration became 9% by mass using N-methyl-2-pyrrolidone (NMP) as a solvent. Then the flask was closed with a separable cover equipped with a stirring impeller, a nitrogen feed tube, and an exhaust tube, and a stirring operation was continued for 30 hours. After completion of the stirring, the dope in the flask was filtrated with a pressure filter (Filter paper No. 60 for viscous liquid, produced by Advantec Toyo Kaisha, Ltd.,) to yield a poly(amic acid) solution composition A. The solution composition A was a viscous liquid with a viscosity of 300 poise. The limiting viscosity number was 1.4.

Preparation Example 2

Preparation of Poly(Amic Acid) Solution Composition B

A poly(amic acid) solution composition B was obtained in the same manner as in Reference Example 1 except that the molar ratio of acid anhydride/diamine was changed to 0.995 and the polymer concentration to 7% by mass. The solution composition B was a viscous liquid with a viscosity of 400 poise. The limiting viscosity number was 2.5.

Preparation Example 3

Preparation of Poly(Amic Acid) Solution Composition C

A poly(amic acid) solution composition C was obtained in the same manner as in Reference Example 1 except that the molar ratio of acid anhydride/diamine was changed to 0.999. The solution composition C was a viscous liquid with a viscosity of 950 poise. The limiting viscosity number was 3.2.

Examples 1 to 3

Production of a Porous Polyimide Film Using the Poly(Amic Acid) Solution Composition A And Its Properties The poly(amic acid) solution composition A prepared in Preparation Example 1 was coated on a substrate, which is a square of side 20 cm, and made of stainless steel having a mirror polished surface, by casting uniformly using a desktop automatic coater at room temperature to a thickness in a range of about 100 to 200 μm. After being left standing in the air at a temperature of 23° C. and a humidity of 40% for 90 sec, the entire substrate was then dipped into a coagulating bath (80 parts by mass of water, and 20 parts by mass of NMP, room temperature). After dipping it was left to stand there still for 8 min, so as to deposit a poly(amic acid) film on the substrate. Thereafter, the substrate was taken out from the bath, and the poly(amic acid) film deposited on the substrate was peeled off, and then immersed in pure water for 3 min to obtain a poly(amic acid) film. The poly(amic acid) film was dried in the air at a temperature of 23° C. and a humidity of 40%, and then stuck to a 10 cm-square pin tenter and the four sides were fixed. The fixed film was placed in an electric furnace for a heat treatment with such a temperature profile, that the temperature was raised to 150° C. at a temperature rising rate of about 10° C./min, then further raised to the maximum temperature set forth in Table 1 at a temperature rising rate set forth in Table 1, and kept there for 3 min to obtain a porous polyimide film. The film thickness, the porosity, and the Gurley value of the obtained porous polyimide film were recorded in Table 1. The shrinkage ratio at thermal imidization was less than 5% in each case.

TABLE 1

|  | Raw material solution | NMP concentration of coagulating bath (%) | Heat treatment conditions | | Properties of porous film | | |
|---|---|---|---|---|---|---|---|
|  |  |  | Temperature rising rate (° C./min) | Maximum temperature (° C.) | Thickness (μm) | Porosity (%) | Gurley value (sec/100 cc) |
| Example 1 | A | 10 | 50 | 360 | 50 | 64 | 2 |
| Example 2 | A | 10 | 100 | 360 | 55 | 66 | 1 |
| Example 3 | A | 10 | 150 | 360 | 61 | 71 | 0.6 |

When a cross section of a porous polyimide film was observed with a scanning electron microscope, it was confirmed in any of the films:

that there were a large number of macrovoids having a length of 10 μm or more in the film transverse direction, that the percentage of the number of voids, of which the ratio (L/d) of the length (L) in the transverse direction to the length (d) in the film thickness direction was within the range of 0.5 to 3 among the voids having a length in the transverse direction of 5 μm or more, was 60% or more, and that there were a large number of macrovoids having a length in the film transverse direction of 10 μm or more, and the cross-sectional area thereof occupied 60% or more of the total cross-sectional area.

The glass transition temperature of a porous polyimide film was about 280° C., and the dimensional stability in terms of dimensional change at 200° C. was within 1%. The rate of film thickness change through application of compressive stress of 0.5 MPa at 250° C. for 15 min was 1% or less.

When the surfaces of a porous polyimide film were observed with a scanning electron microscope, it was confirmed that the surface on the substrate side had a porous structure having a large number of communicating pores, the average pore diameters at both the surfaces were 5.0 μm or more, and the surface opening ratio was 10% or more. Meanwhile, it was confirmed with respect to the opposite surface that the average pore diameter was 3.0 μm or more, and the surface opening ratio was 15% or more.

Examples 4 to 6

Production of a Porous Polyimide Film Using the Poly(Amic Acid) Solution Composition B and the Properties of the Film The same operation as in Example 1 was carried out except that the poly(amic acid) solution composition B was used instead of the poly(amic acid) solution composition A. The heat treatment conditions were in accordance with Table 2. The film thickness, the porosity, and the Gurley value of the obtained porous polyimide film are presented in Table 2. The shrinkage ratio at the time of the thermal imidization was 7% or less in any cases.

When a cross section of a porous polyimide film was observed with a scanning electron microscope, it was confirmed:

that there were a large number of macrovoids having a length of 10 μm or more in the film transverse direction, that the percentage of the number of voids, of which the ratio (L/d) of the length (L) in the transverse direction to the length (d) in the film thickness direction was within the range of 0.5 to 3 among the voids having a length in the transverse direction of 5 μm or more, was 60% or more, and that there were a large number of macrovoids having a length in the film transverse direction of 10 μm or more, and the cross-sectional area thereof occupied 60% or more of the total cross-sectional area.

The glass transition temperature of a porous polyimide film was about 280° C., and the dimensional stability in terms of dimensional change at 200° C. was within 1%. The rate of film thickness change through application of compressive stress of 0.5 MPa at 250° C. for 15 min was 1% or less.

When the surfaces of a porous polyimide film were observed with a scanning electron microscope, it was confirmed that the surface on the substrate side had a porous structure having a large number of communicating pores, the average pore diameters at both the surfaces were 6.0 μm or more, and the surface opening ratio was 12% or more. Meanwhile, it was confirmed with respect to the opposite surface that the average pore diameter was 4.0 μm or more, and the surface opening ratio was 17% or more.

The surface opening ratio, the surface opening diameter, and the average pore diameter of the macrovoids in the planar direction in Examples 1, 2 and 5 are presented in Table 3.

TABLE 2

|  | Raw material solution | NMP concentration of coagulating bath (%) | Heat treatment conditions | | Properties of porous film | | |
|---|---|---|---|---|---|---|---|
|  |  |  | Temperature rising rate (° C./min) | Maximum temperature (° C.) | Thickness (μm) | Porosity (%) | Gurley value (sec/100 cc) |
| Example 4 | B | 14 | 80 | 360 | 46 | 62 | 1 |
| Example 5 | B | 14 | 140 | 360 | 54 | 65 | 0.5 |
| Example 6 | B | 14 | 200 | 360 | 63 | 70 | 0.1 |

TABLE 3

| | Surface layer (a) | | Surface layer (b) | | Average pore diameter of macrovoids in planar direction [μm] |
|---|---|---|---|---|---|
| | Average surface opening ratio [%] | Average surface opening diameter [μm] | Average surface opening ratio [%] | Average surface opening diameter [μm] | |
| Example 1 | 16 | 8 | 13 | 6 | 28 |
| Example 2 | 25 | 16 | 35 | 26 | 36 |
| Example 5 | 21 | 14 | 33 | 42 | 42 |

Comparative Examples 1 and 2

Production of a Porous Polyimide Film Using the Poly(Amic Acid) Solution Composition C and the Properties of the Film The same operation as in Example 1 was carried out except that the poly(amic acid) solution composition C was used instead of the poly(amic acid) solution composition A. The heat treatment conditions were in accordance with Table 4. As a result, shrinkage of the film was severe in the thermal imidization step, and cracks appeared in the film from the sides clamped, and the film was broken. As a result of SEM observation of the broken film, it was confirmed that the surface opening ratio was 10% or less.

TABLE 4

| | NMP concentration of coagulating bath (%) | Heat treatment conditions | | Properties of porous film | | |
|---|---|---|---|---|---|---|
| | | Temperature rising rate (° C./min) | Maximum temperature (° C.) | Thickness (μm) | Porosity (%) | Gurley value (sec/100 cc) |
| Comparative Example 1 | C | 14 | 100 | 360 | Film was broken | |
| Comparative Example 2 | C | 14 | 200 | 360 | Film was broken | |

Comparative Examples 3 and 4

The same operation as in Example 1 was carried out except that the film was stuck to the pin sheet at the time of thermal imidization with a slack of 10%, to obtain a porous polyimide film. As a result of SEM observation, it was confirmed that the surface opening ratio was 10% or less in either surface. The contact angle with respect to water was 70 degrees or more. The results are presented in Table 5. The shrinkage ratio in the thermal imidization was not less than 9% in either case.

TABLE 5

| | NMP concentration of coagulating bath (%) | Heat treatment conditions | | Properties of porous film | | |
|---|---|---|---|---|---|---|
| | | Temperature rising rate (° C./min) | Maximum temperature (° C.) | Thickness (μm) | Porosity (%) | Gurley value (sec/100 cc) |
| Comparative Example 3 | A | 14 | 10 | 360 | 55 | 67 | 21 |
| Comparative Example 4 | A | 14 | 10 | 360 | 45 | 65 | 17 |

Examples 7 and 8

Plasma Treatment on a Porous Polyimide Film

A normal pressure plasma treatment was applied to one side of the porous polyimide films of Comparative Examples 3 and 4 for 60 sec. As a result, the surface opening ratios were improved respectively to 10% or more, and 7% or more. Further, the contact angle with respect to water was lowered to 15 degrees or less. The properties of the porous films after the plasma treatment are presented in Table 6.

TABLE 6

| | Original film | Plasma time (sec) | Properties of porous film | | |
|---|---|---|---|---|---|
| | | | Thickness (μm) | Porosity (%) | Gurley value (sec/100 cc) |
| Example 7 | Comparative Example 3 | 60 | 55 | 69 | 0.1 |
| Example 8 | Comparative Example 4 | 60 | 45 | 67 | 0.1 |

INDUSTRIAL APPLICABILITY

A porous polyimide of the present invention is excellent in permeability of a material such as a gas, and therefore may be suitably used for applications such as a gas filter, a liquid filter, and a ventilation part. By the method of the present invention, such porous polyimide may be easily and efficiently produced.

REFERENCE SIGNS LIST

1 Porous polyimide film
2 Surface layer (a)
25 Fine pore
3 Macrovoid layer
31 Macrovoid
32 Partition wall (Support portion)

35 Pore
4 Surface layer (b)
45 Fine pore

The invention claimed is:
1. A method for producing a porous polyimide film, the method comprising the steps of:
  (1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid); and
  (2) imidizing the porous film of a poly(amic acid) obtained in the step (1) by heat treatment, wherein each of the shrinkage ratios in the longitudinal direction and the transverse direction of the film after heat treatment is suppressed to 8% or lower, and the temperature rising rate in the temperature region of 200° C. or higher in the heat treatment is 25° C./min or higher,
  wherein the porous polyimide film is a three-layer structure porous polyimide film having two surface layers (a) and (b), and a macrovoid layer sandwiched between the surface layers (a) and (b),
  the macrovoid layer has partition walls bonded to the surface layers (a) and (b), and a plurality of macrovoids surrounded by the partition walls and the surface layers (a) and (b) and having a mean pore size in the film plane direction of from 10 to 500 μm,
  the partition walls of the macrovoid layer have a thickness of 0.1 μm to 50 μm,
  at least one partition walls have one or a plurality of pores communicating adjacent macrovoids,
  each of the surface layers (a) and (b) has a thickness of 0.1 μm to 50 μm,
  at least one of the surface layers (a) and (b) has a plurality of fine pores having an average pore diameter of more than 5 μm and not more than 200 μm, while the other has a plurality of fine pores having an average pore diameter of 0.01 μm to 200 μm;
  the surface opening ratio of at least one of the surface layer is not less than 10%, while that of the other surface layer is not less than 5%;
  the fine pores in the surface layers (a) and (b) communicate with the macrovoids; and
  the porous polyimide film has a total film thickness of 5 μm to 500 μm, the Gurley value being not more than 20 sec/100 cc, and a porosity being 60% to 95%.
2. The method for producing a porous polyimide film according to claim 1, wherein the poly(amic acid) comprises at least one tetracarboxylic dianhydride selected from the group consisting of biphenyltetracarboxylic dianhydride and pyromellitic dianhydride; and at least one diamine selected from the group consisting of benzenediamine, diaminodiphenyl ether and bis(aminophenoxy)phenyl.
3. The method for producing a porous polyimide film according to claim 1 or 2, wherein the coagulating solvent comprising water as an essential component is water, or a mixed solution of 5% by mass or more and less than 100% by mass of water, and more than 0% by mass to 95% by mass or less, of an organic polar solvent.
4. The method for producing a porous polyimide film according to claim 1 or 2, further comprising the step of subjecting at least one surface of the porous polyimide film obtained in the step (2) to plasma treatment.
5. A method for producing a porous polyimide film, the method comprising the steps of:
  (1) casting a poly(amic acid) solution consisting of 3 to 60% by mass of a poly(amic acid) having an limiting viscosity number of 1.0 to 3.0, the poly(amic acid) consisting of tetracarboxylic acid unit and diamine unit, and 40 to 97% by mass of an organic polar solvent into a film-like shape, and dipping in or bringing it into contact with a coagulating solvent comprising water as an essential component to prepare a porous film of poly(amic acid);
  (2) imidizing the porous film of a poly(amic acid) obtained in the step (1) by heat treatment, and
  (3) subjecting at least one surface of the porous polyimide film obtained in the step (2) to plasma treatment,
  wherein the porous polyimide film is a three-layer structure porous polyimide film having two surface layers (a) and (b), and a macrovoid layer sandwiched between the surface layers (a) and (b),
  the macrovoid layer has partition walls bonded to the surface layers (a) and (b), and a plurality of macrovoids surrounded by the partition walls and the surface layers (a) and (b) and having a mean pore size in the film plane direction of from 10 to 500 μm,
  the partition walls of the macrovoid layer have a thickness of 0.1 μm to 50 μm,
  at least one partition walls have one or a plurality of pores communicating adjacent macrovoids,
  each of the surface layers (a) and (b) has a thickness of 0.1 μm to 50 μm,
  at least one of the surface layers (a) and (b) has a plurality of fine pores having an average pore diameter of more than 5 p.m and not more than 200 p.m, while the other has a plurality of fine pores having an average pore diameter of 0.01 μm to 200 μm;
  the surface opening ratio of at least one of the surface layer is not less than 10%, while that of the other surface layer is not less than 5%;
  the fine pores in the surface layers (a) and (b) communicate with the macrovoids; and
  the porous polyimide film has a total film thickness of 5 μm to 500 μm, the Gurley value being not more than 20 sec/100 cc, and a porosity being 60% to 95%.

* * * * *